United States Patent
Perez

(10) Patent No.: US 9,179,276 B2
(45) Date of Patent: Nov. 3, 2015

(54) SIMULATED CITIZENS' BAND CONFERENCING SYSTEM

(71) Applicant: Edward J Perez, Apollo Beach, FL (US)

(72) Inventor: Edward J Perez, Apollo Beach, FL (US)

( * ) Notice: Subject to any disclaimer, the term of this patent is extended or adjusted under 35 U.S.C. 154(b) by 40 days.

(21) Appl. No.: 14/487,576

(22) Filed: Sep. 16, 2014

(65) Prior Publication Data

US 2014/0378109 A1 Dec. 25, 2014

Related U.S. Application Data

(63) Continuation-in-part of application No. 13/770,294, filed on Feb. 19, 2013, now abandoned.

(51) Int. Cl.
| | |
|---|---|
| *H04M 3/42* | (2006.01) |
| *H04M 3/56* | (2006.01) |
| *H04W 4/16* | (2009.01) |
| *H04L 29/06* | (2006.01) |
| *H04L 12/18* | (2006.01) |

(52) U.S. Cl.
CPC ............ *H04W 4/16* (2013.01); *H04L 12/1818* (2013.01); *H04L 65/403* (2013.01); *H04L 65/4061* (2013.01); *H04M 3/42008* (2013.01); *H04M 3/56* (2013.01); *H04L 12/189* (2013.01); *H04M 2203/2088* (2013.01); *H04M 2203/2094* (2013.01)

(58) Field of Classification Search
CPC ...... H04W 4/023; H04W 4/602; H04L 67/18; H04L 65/4038
See application file for complete search history.

(56) References Cited

U.S. PATENT DOCUMENTS

| | | | | |
|---|---|---|---|---|
| 5,436,896 | A | * | 7/1995 | Anderson et al. ............. 370/260 |
| 6,163,692 | A | * | 12/2000 | Chakrabarti et al. ......... 455/416 |
| 6,618,593 | B1 | | 9/2003 | Drutman et al. |
| 6,839,417 | B2 | * | 1/2005 | Weisman et al. ........ 379/204.01 |
| 7,593,740 | B2 | * | 9/2009 | Crowley et al. ............ 455/456.3 |
| 8,131,298 | B1 | | 3/2012 | Beyer, Jr. |
| 2002/0107008 | A1 | | 8/2002 | Hendrey et al. |
| 2004/0192331 | A1 | | 9/2004 | Gurday et al. |
| 2008/0031426 | A1 | | 2/2008 | Weeks |
| 2012/0226997 | A1 | * | 9/2012 | Pang ............................. 715/753 |

* cited by examiner

*Primary Examiner* — San Htun
*Assistant Examiner* — Tabla Glomah
(74) *Attorney, Agent, or Firm* — Thomas J. Germinario

(57) ABSTRACT

An internet-based conferencing system simulates the experience of Citizens' Band (CB) radio communications without the use of CB radio transceivers. Instead of direct RF links between participants, the CBI system employs a combination of user-resident application software, central server-based conferencing software, GPS location data, and Voice over IP (VoIP) or voice over cellular technology. In the set-up procedure of the application software, the participant selects an alias CB-style "handle" and a caricature picture, neither of which disclose the true identity or location of the participant. Since the participants are known only by their alias and caricature, their anonymity is preserved, thereby enabling greater freedom of expression and interpersonal tolerance. Participants do not select the other participants in their conference, but are assigned to a virtual "channel" based on a selected conference category and proximity criteria, thereby simulating the serendipity of CB radio communications.

5 Claims, 5 Drawing Sheets

SIMULATED CITIZENS' BAND CONFERENCING SYSTEM

REFERENCE TO RELATED APPLICATION

This patent application is a continuation-in-part of U.S. patent application Ser. No. 13/770,294, filed Feb. 19, 2013.

BACKGROUND OF THE INVENTION

The present invention relates to the general field of wireless telecommunications, and more specifically to field of wireless networking systems.

The purpose of the present invention is to simulate the experience of Citizens' Band (CB) radio communications without the use of CB radio transceivers. Instead of direct RF links between communicants, the present invention employs a combination of user-resident application software, central server-based conferencing software, GPS location data, and Voice over IP (VoIP) and/or voice over cellular technology.

Two salient features of old-fashioned CB radio communications are serendipity and anonymity. There is the thrilling spontaneity of being able to reach out and talk to an unpredictable cross-section of the population who just happen to have tuned into the same "channel" at the same time. And there's also the security of being known only by one's CB "handle," which enables greater freedom of expression and interpersonal tolerance.

Existing systems of wireless teleconferencing do not simulate the experience of CB radio communications. Existing systems require the user to select the individual participants in the conference based on location and/or profile characteristics, and they all disclose information about the user and/or his/her location to the other participants.

A series of U.S. patents issued to Beyer, Jr., et al. (U.S. Pat. Nos. 7,630,724; 7,853,273; 8,126,441; 8,131,298) describe various methods for initiating mobile phone calls, including conference calls, based on geographic location and/or proximity. But these methods do not enable CB-type conference calling, since the user must select each individual participant in the call by activating geo-referenced map symbols associated with each participant. Moreover, the Beyer system lacks the user anonymity feature of the present invention, since it discloses the identity and location of all participants in the conference call.

The U.S. patent application of Gorday et al. (2004/0192331) discloses a method of sending messages from a particular communication device to one or more target communicants selected from a set of potential communicants based on geographic location. But, as in the Beyer patents, each participant must be individually selected by the user, which is contrary to the CB model of the present invention.

The U.S. patent application of Hendrey et al. (2002/0107008) teaches a method that enables a mobile phone user to request a group connection based on location/proximity. But the Hendrey system relies on a user attribute profile database to identify proximate "match" callers to be included in the conference call, whereas the present invention requires no such user profiles and allows the caller to select his/her own criteria for connection.

The U.S. patent application of Drutman et al. (U.S. Pat. No. 6,618,593) describes a location dependent user matching system for mobile communication devices. As with the Hendrey system, however, the connections between users are determined by user profiles based on compiled characteristics and/or preferences of the user. Hence, this patent does not simulate CB-type communications as does the present invention.

The U.S. patent of Crowley et al. (U.S. Pat. No. 7,593,740) discloses a method of establishing connections among users of mobile devices based on location/proximity. But since the connection criteria are based on acquaintance and/or relationship between the users, it lacks the random element of CB-type connections, as well as their anonymity.

The U.S. patent application of Weeks (2008/0031426) teaches a system for generating conference calls between a 911 caller and police patrol cars in the caller's area. Since the conference call is initiated and controlled by the 911 operator, however, the Weeks system is not adaptable to simulating a CB-type group communication.

SUMMARY OF THE INVENTION

The present invention is an internet-based CB-simulation conferencing (CBI) system. The CBI system may be utilized from any initiating device, such as a cell phone or tablet computer, capable of accessing a wireless telecommunications network using one of the mobile telecommunications protocols, such as CDMA or GSM. The initiating device must also be capable of accessing the internet and receiving satellite GPS location data.

In order to participate in the CBI network, a user must download the CBI application software to his/her wireless device. When downloaded, the CBI application software initiates a setup procedure whereby the user selects an alias "handle" and a picture display, which constitute the user's profile. During the setup procedure, the user can also set default preferences regarding the distance range of communications.

Once the CBI application setup is complete, the user is ready to participate in a simulated CB conference. The menu system of the CBI application software allows the user to select a "channel" from among various "channels" based on subject matter, personal interests, location, proximity, age group, etc. The menu system also allows the user to set a maximum distance for participants in the CB-type conference.

The user's profile, his/her GPS coordinates, and his/her "channel" and distance selections are transmitted via the wireless telecommunications network to the CBI central server. The CBI central server uses conference bridge software to assign the user to one of multiple virtual "conference rooms" with other conference participants based on the selected "channel" and distance range.

When one of the conference participants in the user's "room" speaks, his/her voice is transmitted by the central server via voice over cellular, or via the internet, using one of the VoIP protocols, such as Session Initiation Protocol (SIP), to a cellular gateway, which converts it to a digital telecommunications format and transmits it through the wireless network to all of the conference participants, along with the speaking participant's "handle" and display picture.

In order to participate in the conference discussion, the user activates a touch screen "talk" button, whereupon his/her voice is transmitted over the wireless network to the cellular gateway, which converts it to VoIP and sends it via the internet to the central CBI server, or sends it via voice over cellular to the central CBI server. The CBI server utilizes the conference bridge either to transmit the user's VoIP speech back through the internet, or to transmit the user's cellular speech to the other participants in the user's "room" via the cellular gateway and the wireless network. In addition to hearing the user's voice over their wireless devices, the other participants see his/her "handle" and his/her display picture.

The conference bridge software controls the participants' discussion so that only one participant has the "floor" at any given time, based on who was first to activate their touch screen "talk" button. Optionally, a user can also use touch screen buttons to switch channels, or to request a one-on-one private communication with one of the conference participants. The system can also incorporate a feature by which certain participants are designated as "blocked," so that the user is warned if the blocked individual is on a particular "channel" and can avoid accessing that "channel".

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENTS

Figure 1:
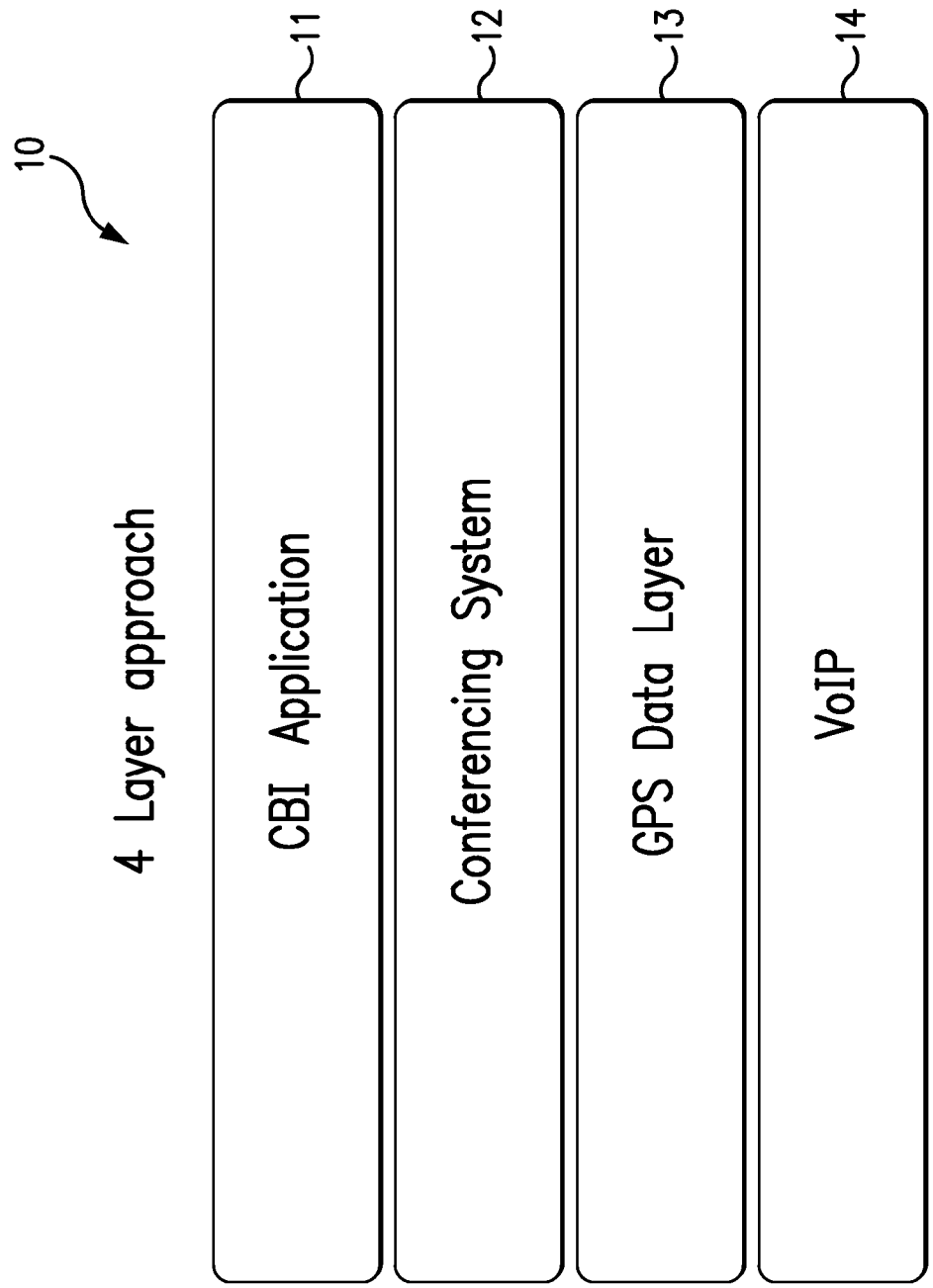
FIG. 1 is a schematic diagram of the hierarchal software structure of the CB-simulation conferencing (CBI) system according to the preferred embodiments of the present invention.

As shown in FIG. 1, the preferred embodiments of the present invention 10 employ a combination of user-resident application software 11, central server-based conferencing software 12, GPS location data 13, and Voice over IP (VoIP) technology 14.

Figure 2A:
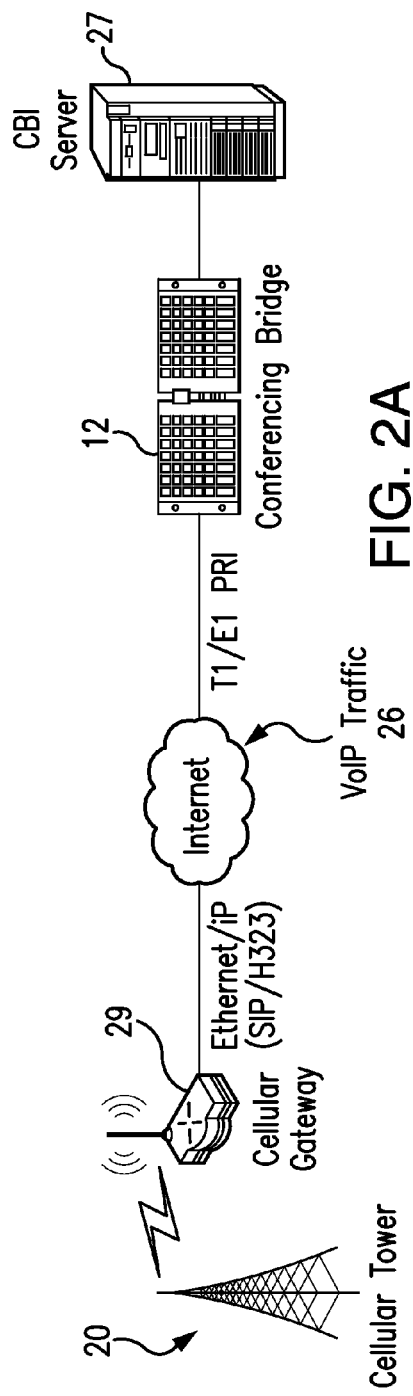
FIG. 2A is a schematic diagram of the functional network components of the CBI system according to the preferred embodiments of the present invention.
Figure 2B:
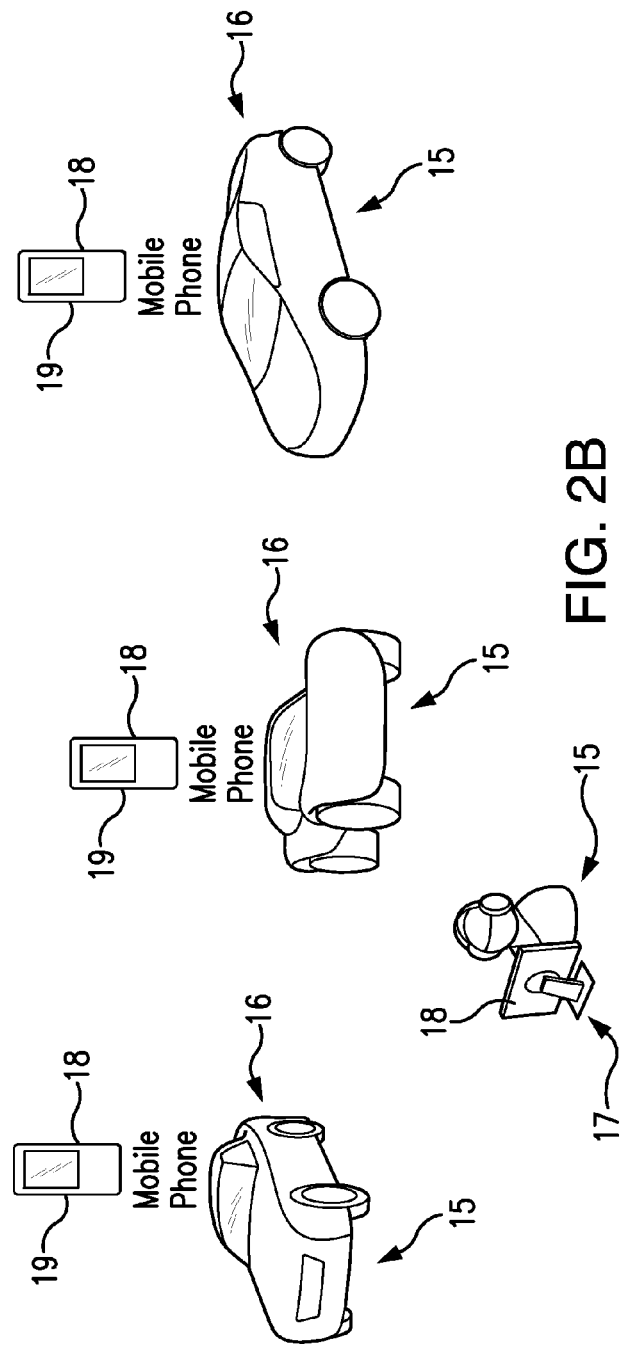
FIG. 2B depicts four exemplary participants in a simulated CB conference according to the preferred embodiments of the present invention.

An exemplary functional schematic of the CBI system is depicted in FIG. 2A. By way of illustration, we will describe a hypothetical CB-type conference among the four participants 15 portrayed in FIG. 2B, comprising three mobile phone participants 16 and a fourth participant using a personal computer 17. All of the initiating devices 18 must have internet access, and the wireless devices 19 must also have access to a wireless telecommunications network 20 and be able to receive GPS data 13.

Figure 3A:
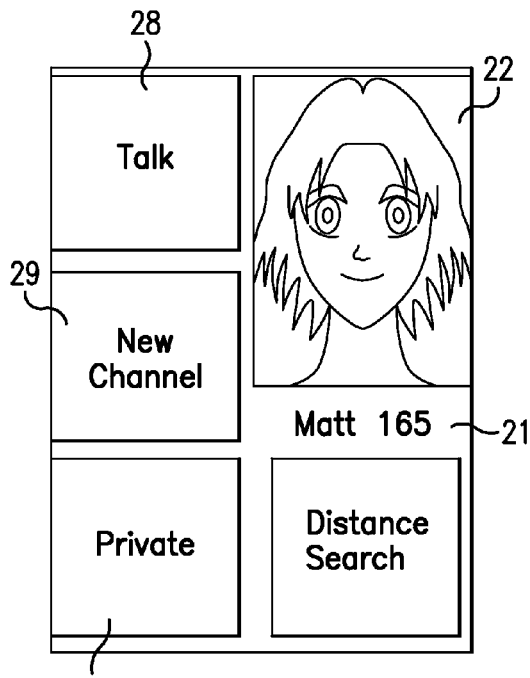
FIGS. 3A, 3B and 3C depict the user "handles" and display pictures of three of the exemplary participants of FIG. 2B.
Figure 3B:
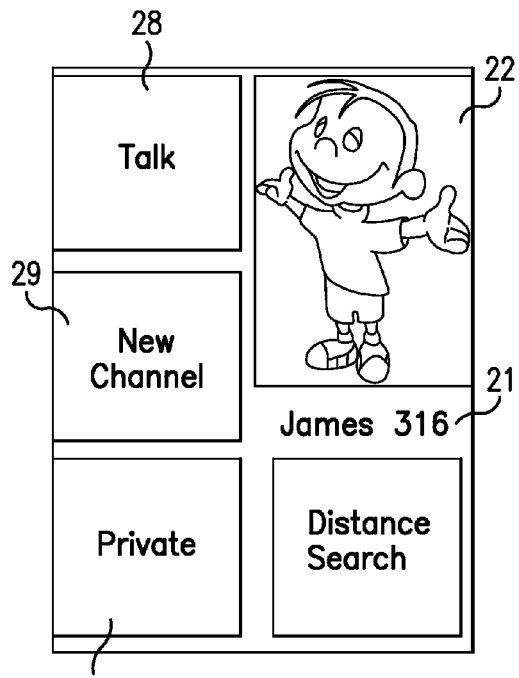
Figure 3C:
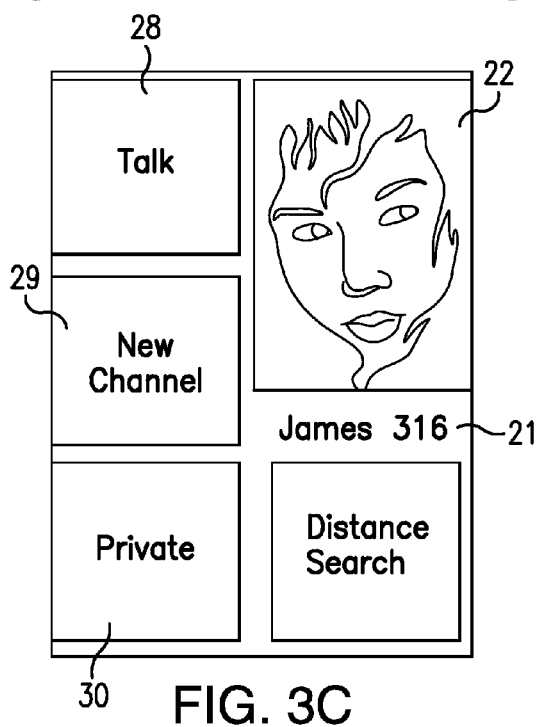

Each participant 15 must download the CBI application software 11 to his/her initiating device 18. Upon being downloaded, the application software 11 initiates a setup procedure, in which each of the participants selects a CB-style "handle" alias and a display picture, which preferably comprises a pseudo-portrait or caricature. FIGS. 3A, 3B and 3C depict illustrative "handles" 21 and display pictures 22 for the three hypothetical mobile participants 16 of our example. In order to maintain the anonymity of CB-type communication, the aliases 21 and caricatures 22 of the participants 16 do not disclose the actual identity or location of the participants 16.

Figure 4A:
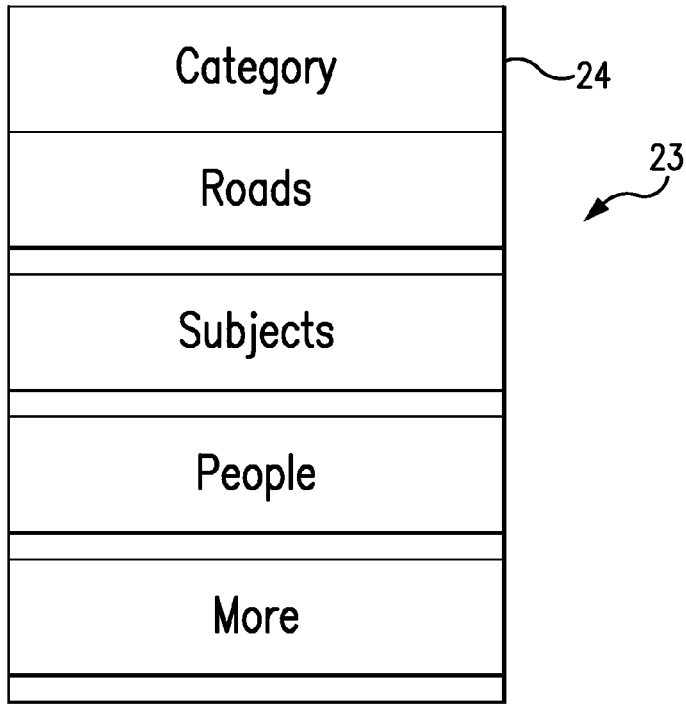
FIGS. 4A and 4B depict two exemplary menus of the CBI application software.
Figure 4B:
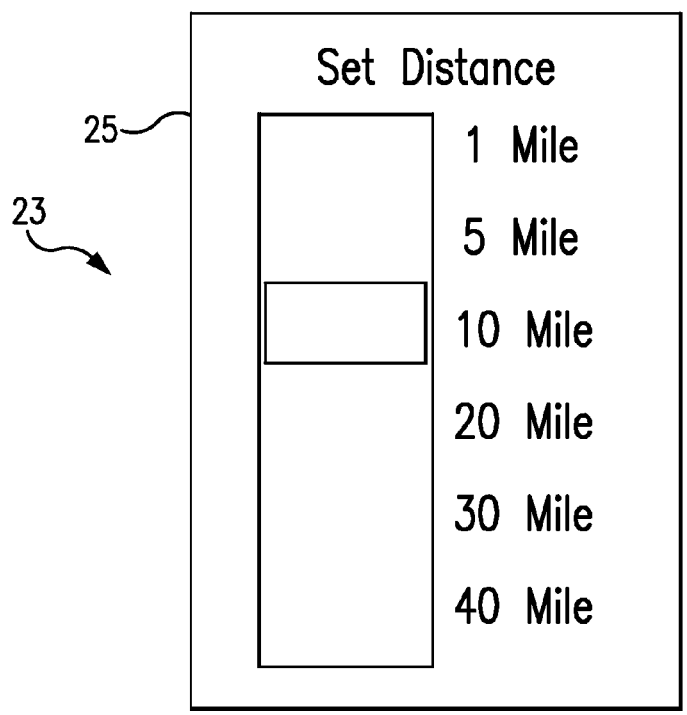

As shown in FIGS. 4A and 4B, the CBI application software 11 has a menu system 23, which each participant 15 uses to select a conference category 24 from among multiple conference categories and to select a maximum distance range 25 between the participants 15 in the conference. Each of the conference categories 24 describes either the subject matter of the conference or a characteristic of the participants in the conference, such as their age, sports affiliations, proximity, interests, etc.

Figure 5:
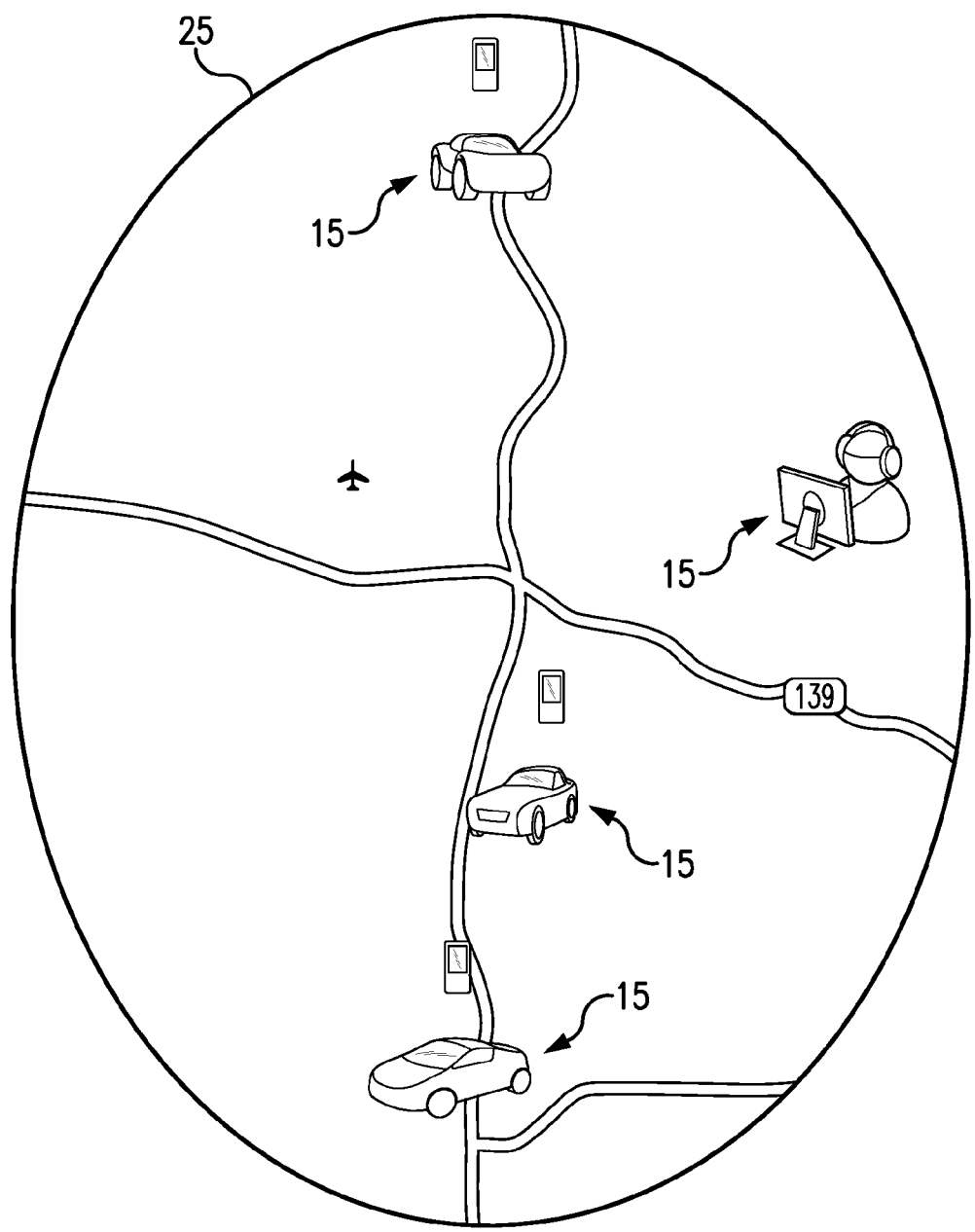
FIG. 5 is a geo-referenced schematic diagram of the exemplary participants of FIG. 2B.

Referring again to FIG. 2A, once the participant has selected a conference category 24 and a distance range 25, that application software 11 causes the initiating device 18 to transmit those selections, along with the participant's "handle" 21 and caricature 22, via internet VoIP traffic 26 to the CBI central server 27. The central server 27 uses conference bridge software 12 to assign each participant 15 to one of multiple virtual "conference room" conference domains based the participant's selected conference category 24 and selected distance range 25. In our example, the participants 15 have all selected the same conference category 24 and are located within the selected distance radius 25, as pictured in FIG. 5, so they are all connected to one another in the same virtual "conference room" by the CBI system.

The conference bridge software 12 is configured so that only one participant 15 at a time can speak in the conference, and the speaking participant is identified to the non-speaking participants only by his/her alias 21 and display picture 22. Referring to FIGS. 3A-3C, a participant 15 touches a "talk" button 28 from the application software 11 to participate in the conference discussion. Referring to FIG. 2A, the speech of each participant 15 is transmitted from his/her initiating device 18 to the central server via internet VoIP 26, with a cellular gateway 29 acting as an interface between the wireless telecom network 20 and the internet VoIP network 26.

The conference bridge 12 re-transmits the speaking participant's speech from the central server 27, via the VoIP protocol 26, to the initiating devices 18 of the non-speaking participants, along with the alias 21 and the display picture 22 of the speaking participant. Once again, the cellular gateway 29 acts as an interface between the wireless telecom network 20 and the internet VoIP network 26.

Referring again to FIGS. 3A-3C, the CBI application software 11 can provide a touch-screen "New Channel" button 29 that enables the participant 15 to switch conference categories 24, whereupon the conference bridge software 12 reassigns the participant 15 to another conference domain, corresponding to the newly selected conference category 24. The application software 11 can also provide a touch-screen "Private' button 30, to enable the participant 15 to engage in a one-on-one private discussion with one of the other participants in the conference.

Other optional features of the CBI application software 11 enable the participant 15 to designate one of more blocked individuals, such that the application software 11 notifies the participant 15 before he/she is assigned to a conference domain to which one or more of the blocked individuals have been assigned. After getting the warning, the participant 15 can switch conference categories 24, using the "New Channel" button 29, to avoid interaction with the blocked individual(s). In case of a drop call, the application software 11 can also automatically reconnect the participant 15 to the conference, or offer him/her the option of doing so.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A method of establishing and conducting a conference between and among multiple participants, consisting of the following steps:
    (a) providing each participant with an initiating device, wherein each initiating device is capable of accessing a wireless telecommunications network, accessing the internet and receiving satellite GPS location data;
    (b) providing each participant with an application software that is downloaded to each initiating device, wherein the application software, upon being downloaded, initiates a setup procedure whereby the participant selects an alias and a display picture, and wherein neither the alias nor the display picture reveals the actual identity or location of the participant;
    (c) incorporating in the application software a menu system, wherein each participant uses the menu system to select a conference category from among multiple conference categories and to select a maximum distance range between the participants in the conference, and wherein each of the conference categories describes either the subject matter of the conference or a characteristic of the participants in the conference;
    (d) from each initiating device, transmitting the participant's alias, display picture, GPS location data, selected conference category, and selected distance range via the wireless telecommunications network to a central server, wherein the central server uses a conference bridge software to assign each participant to one of multiple virtual conference domains based the participant's selected conference category and selected distance range;
    (e) assignment by the central server of the participants to a common conference domain based on the participants' selection of a common conference category and a coextensive distance range, thereby establishing the conference between and among the participants;
    (f) configuring the conference bridge software so that only one participant at a time can speak in the conference, such that at any time there is one speaking participant and one or more non-speaking participants, and such that the no voices of non-speaking participants are audible, and such that the speaking participant is identified to the non-speaking participants only by his/her alias and display picture;
    (g) transmitting utterances of the speaking participant from the initiating device of the speaking participant to the central server via the wireless telecommunications network, or via the internet, using a VoIP protocol; and
    (h) using the conference bridge to re-transmit the utterances of the speaking participant from the central server via the wireless telecommunications network, or via the internet, using the VoIP protocol, to the initiating devices of the non-speaking participants, and using the conference bridge to simultaneously transmit the alias and the display picture of the speaking participant via the wireless telecommunications network, or via the internet, using the VoIP protocol, to the initiating devices of the non-speaking participants.

2. The method of claim 1, wherein the application software enables the participant to switch conference categories from a first selected conference category to a second selected conference category, whereupon the conference bridge software reassigns the participant from a first conference domain, corresponding to the first selected conference category, to a second conference domain, corresponding to the second selected conference category.

3. The method of claim 2, wherein the application software enables the participant to designate one of more blocked individuals, and wherein the application software notifies the participant before the participant is assigned to a conference domain to which one or more of the blocked individuals have been assigned, so that the participant can switch conference categories to avoid interaction with the blocked individual(s).

4. The method of claim 3, wherein the application software is configured to detect an involuntary disconnection of the participant from the conference and to automatically reconnect the participant to the conference, or offer the participant the option of being reconnected to the conference.

5. The method of claim 4, wherein the application software is configured to enable the participant to engage in a one-on-one private discussion with one of the other participants in the conference.

* * * * *